(No Model.)  3 Sheets—Sheet 1.

E. N. BARBER.
SPEED INDICATOR.

No. 398,928.  Patented Mar. 5, 1889.

WITNESSES:
Theo. G. Hoster
C. Sedgwick

INVENTOR:
E. N. Barber
BY Munn & Co.
ATTORNEYS.

(No Model.) 3 Sheets—Sheet 3.

E. N. BARBER.
SPEED INDICATOR.

No. 398,928. Patented Mar. 5, 1889.

WITNESSES:
Theo. G. Hoster
C. Sedgwick

INVENTOR:
E. N. Barber
BY Munn & Co
ATTORNEYS.

UNITED STATES PATENT OFFICE.

EMMET N. BARBER, OF KENT, OHIO.

SPEED-INDICATOR.

SPECIFICATION forming part of Letters Patent No. 398,928, dated March 5, 1889.

Application filed August 24, 1886. Serial No. 211,747. (No model.)

*To all whom it may concern:*

Be it known that I, EMMET N. BARBER, of Kent, in the county of Portage and State of Ohio, have invented a new and Improved Speed-Indicator, of which the following is a full, clear, and exact description.

The object of my invention is to provide a new and improved speed-indicator specially adapted to indicate the speed of a rotating shaft, the speed of a locomotive, or the speed of a moving vehicle.

The invention consists in a compartment in or through the wall of which is one or more apertures, and in a part which by the pressure of the actuating-fluid (which is forced into the compartment by a device actuated by the moving part or locomotive, &c., the speed of which is being determined in volume varying with said speed) opens a portion of said aperture or apertures (varying with the volume of said fluid) to the passage of said fluid from the compartment, and by the pressure of a spring tends to close said aperture or apertures to the passage of said fluid; in arranging a pointer and graduated scale, in connection with the parts which change position from the pressure of the fluid or the spring, so that a corresponding change of position of the pointer on the graduated scale is produced; in applying to a speed-indicator a device consisting of a chamber closed at one end and filled with the actuating-fluid, with a piston working therein by being properly connected with the moving parts of the indicator, and which causes said moving parts to change position slowly, thus preventing vibration of the indicator from whatever cause such tendency may come, and in so balancing said piston and other moving parts that there is no tendency to vibrate from sudden jars, &c.

The invention consists also of various parts and details and combinations of the same, as will be fully described hereinafter and then pointed out in the claims.

Figure 1:
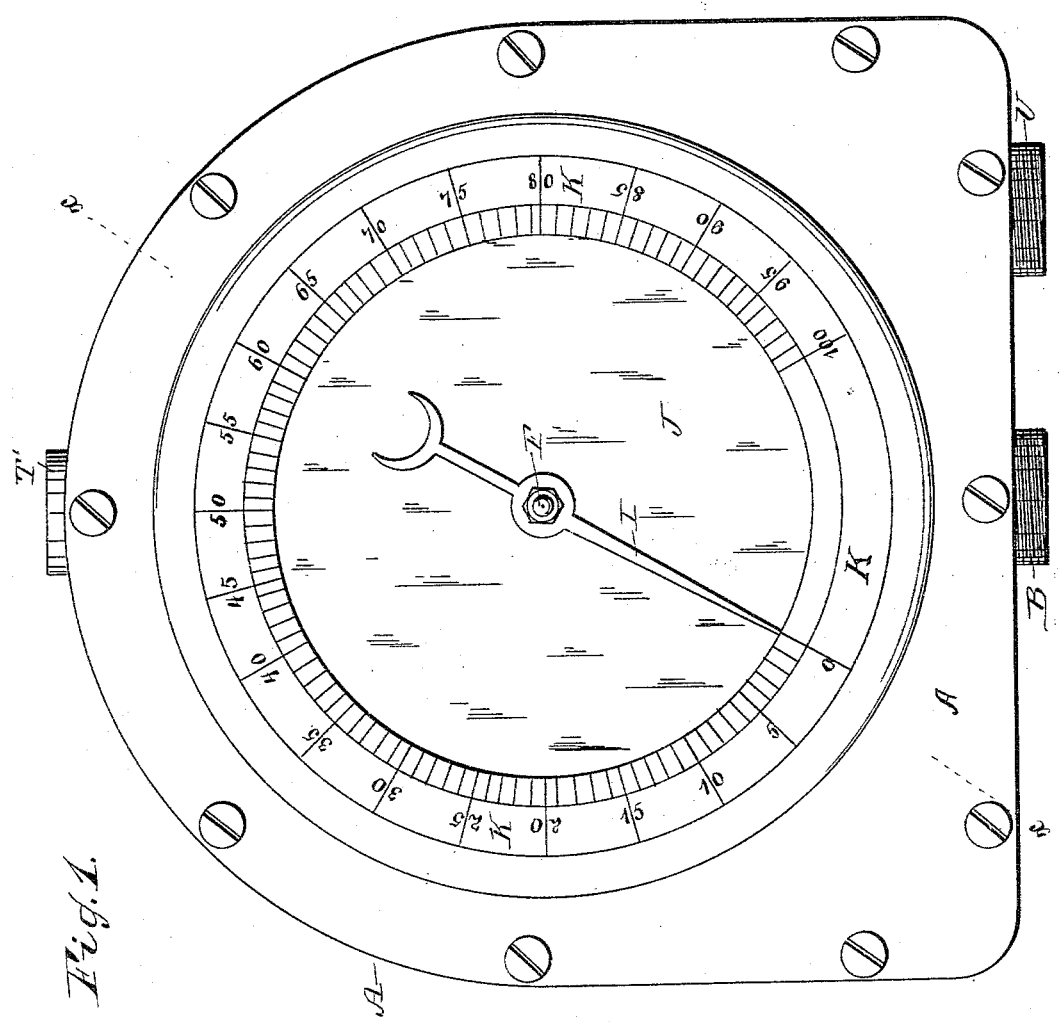
Figure 2:
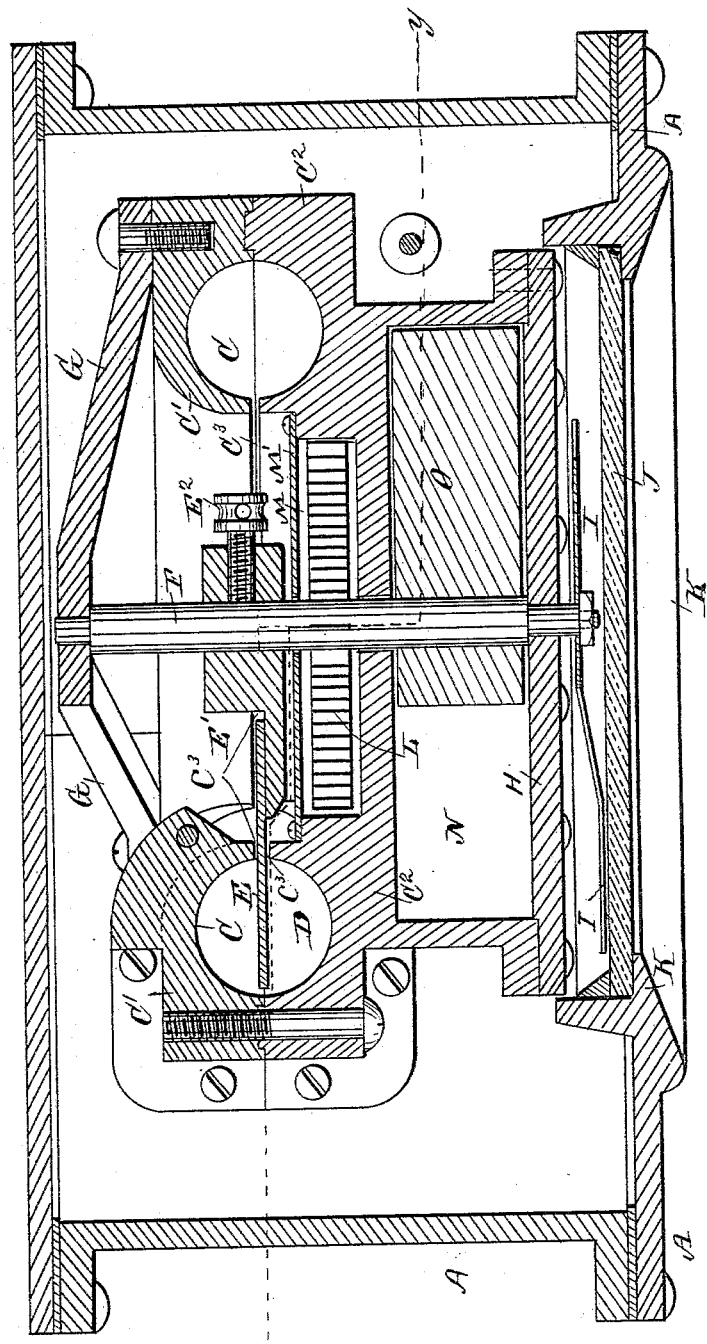
Figure 3:
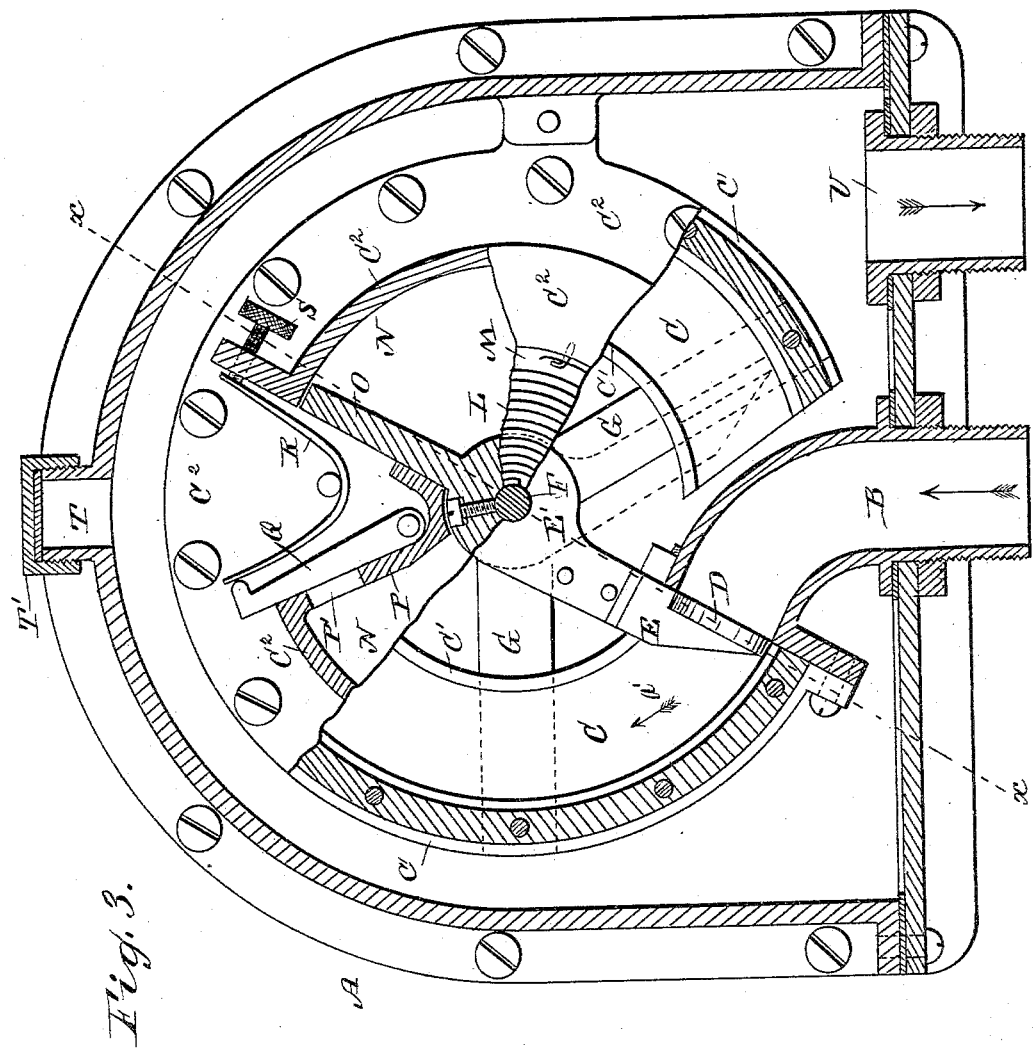

Figure 1 is a front view of my improvement. Fig. 2 is a transverse section of the same on the line $x$ $x$, Figs. 1 and 3; and Fig. 3 is a longitudinal vertical section of the same on the line $y$ $y$, Fig. 2.

To the casing A, of suitable construction, is attached the inlet-pipe B, which opens at its inner end into the compartment C, formed by the parts C' and C², secured together and fastened to the casing A. In the compartment C operates the piston D, attached to an arm, E, which passes through a slot, C³, formed between the parts C' and C², and is attached to the hub E', secured by a set-screw, E², or other device, to the shaft F, having its bearings at one end of the bracket G, attached to the part C', the other end of the shaft passing through the cover or plate H, and carrying on its outer end a hand or pointer, I, covered by a glass plate, J, and indicating on the dial-plate K, formed on the front of the casing A.

In a recess, M, formed in the center of the part C² and covered by a plate, M', is placed a coil-spring, L, the inner end of which is attached to the shaft F and the outer end to the part C². The cover or plate H is fitted over a chamber, N, formed beside the compartment C in the part C², through which compartment N passes the shaft F, which carries the piston O, operating in the said compartment N and placed diametrically opposite the piston D in the compartment C. One end of the chamber N is open and the other end is closed by a wall, P, provided with an outlet, P', which is ordinarily closed by a valve, Q, pivoted on the part C² and held against the partition P by the spring R, the pressure of which is regulated by the set-screw S. The piston O fits loosely in the compartment N, so that the fluid can pass from one side of the piston to the other slowly.

The casing A is provided on its top with an opening, T, which can be closed by a screw-cap, T'. An outlet-pipe, U, is secured to the bottom plate of the casing A.

The operation is as follows: The indicator is operated by means of a suitable fluid, such as alcohol, coal-oil, &c. If a certain quantity or volume of fluid is constantly forced through an aperture at a certain pressure in a certain time and the volume is increased or diminished without changing the pressure or the time, the size of the aperture must be increased or diminished in the same ratio. On this principle I base my invention, in which the length of the portions of an aperture or apertures through which the fluid is forced is increased or diminished as the volume of fluid is increased or diminished. Thus the part which is made to change position in adjusting the portion of the aperture or apertures indicates the speed of the machinery which forces the fluid by causing a corresponding change in the position of an indicator on a graduated scale. To operate this indicator, any well-known mechanical means may be used to force a continuous stream or volume of fluid which is properly connected with the moving part of the machine the speed of which is to be indicated in such a manner that the volume of fluid discharged will increase or diminish as the speed of the moving part of the machine increases or diminishes. The pipe through which the fluid is discharged from the pump or forcing mechanism is connected with the supply-pipe B of the indicator, and the fluid is returned to the pump or forcing mechanism through the pipe U and proper connections, so that the pump, the pipes, the casing A, and the several compartments of the indicator are completely filled with the fluid employed, so as to form a continuous circuit. The fluid from the pump or forcing mechanism enters through the pipe B and presses the piston D forward in the direction of the arrow $a'$ against the pressure of the coil-spring L, passes out of the compartment C through the slot $C^3$, and returns to the pump by passing into the pipe U. The piston D continues to move in the direction of the arrow $a'$ as long as the pressure from the pump or forcing mechanism exceeds the pressure of the spring, and the piston D remains stationary as soon as the pressure of the fluid and of the spring is equal, or as soon as the size of the aperture corresponds with the volume of the fluid which the pump is discharging, which volume passes through the slot $C^3$ at the pressure exerted by the spring L. Thus an increase or decrease of the speed of the machine to which the indicator is attached causes a corresponding increase or decrease in the length of travel of the piston D, and the consequent enlarging or diminishing of the portion of the aperture $C^3$ through which the fluid passes, caused by the automatic change of position of the piston D. The movement of the piston D is consequently indicated by the pointer I, attached to the shaft F, and the speed of the moving part can thus be seen at a glance by reference to the dial K.

It will be seen that the inertia of the fluid and of the moving parts and their momentum would carry the piston D beyond the point at which it should stop, and it would be again forced back toward its former position by the spring L. This causes a vibratory motion of the indicator, and to overcome this I have placed the piston O within a compartment, N, and the fluid exerts against the piston O a pressure equal to that exerted against the piston D whenever it attempts to move quickly, and thus prevents any quick or rapid change in the position of the moving parts. As the piston O works within a reasonably close-fitting compartment, one end of which is closed by the partition P and valve Q, it cannot change position or move quick enough to vibrate, because it must force some of the fluid in the compartment out between the piston O and the walls of the compartment—that is to say, the fluid must be changed from one side of the piston O to the other. This can be done but slowly without great pressure; but if the pressure of the piston O against the fluid exceeds its prescribed limits the valve Q opens the aperture P', and thus permits the fluid to pass from the compartment N into the interior of the casing, so that the moving parts can change their positions more rapidly. The pressure of the valve Q is regulated by the adjustable spring R.

Having thus fully described my invention, I claim as new and desire to secure by Letters Patent—

1. In a speed-indicator, the combination, with the casing having a fluid inlet and discharge, as specified, and a curved compartment, C, one of whose sides or walls is slotted lengthwise, of an arm pivoted on a central spring-actuated shaft and working in the aforesaid slot, and a piston attached to the outer end of said arm and working in the compartment, substantially as specified, whereby the piston vibrates and opens or closes the slot more or less, according to the pressure of the fluid and the consequent increase or decrease of the volume passing through the slot.

2. In a speed-indicator, the combination, with an oscillating shaft, of two pistons, each connected to the said shaft and working in separate chambers, one of the said pistons automatically increasing or decreasing the available portion of the discharge-opening of its chamber as the volume of the actuating-fluid passing increases or decreases, and the other piston serving to prevent quick or vibratory motions of the said shaft, a pointer carried by the shaft, and a graduated scale over which the pointer works, substantially as herein shown and described.

3. In a speed-indicator, the combination, with a casing having two chambers, one of which communicates directly with the supply-pipe and is provided with a discharge-opening, of two pistons, one in each chamber, a shaft to which the said pistons are connected, a spring for actuating the shaft backward, a pointer, and graduated scale, substantially as and for the purpose set forth.

4. In a speed-indicator, the combination, with an outer casing and an inner casing having two chambers, one of which communicates with the supply-pipe and is provided with a discharge-opening, of a shaft provided with a pointer on its end, a spring secured to the shaft and casing, pistons secured to the said shaft and working in the said chambers, one of the pistons having its rod projecting through the discharge-opening of its chamber, and a graduated scale, substantially as described.

5. In a speed-indicator, the combination, with a casing provided with two chambers, of a piston in one chamber for automatically increasing or decreasing the available portion of its discharge-opening as the volume of fluid passing increases or decreases, and a piston in the other chamber for overcoming the vibratory motion of the first-named piston, substantially as described.

6. In a speed-indicator, a casing having a chamber or compartment, a piston operating in the same, a shaft connected with the piston, a coil-spring on the said shaft, a pointer, and a dial, in combination with a chamber, a piston operating in the same, substantially as shown and described.

7. In a speed-indicator, a casing having a chamber or compartment, a piston operating in the same, a shaft connected with the piston, a coil-spring on the said shaft, a pointer, a dial, the chamber N, and the piston O, in combination with a valve covering an aperture in the wall of said chamber regulated by a spring and screw, substantially as shown and described.

EMMET N. BARBER.

Witnesses:
A. E. ATKINS,
I. D. TUTTLE.